Sept. 7, 1926.

C. G. ROESCH 1,599,350

ELECTRICAL ADVERTISING MACHINE

Filed Nov. 7, 1924     6 Sheets-Sheet 1

Christian G. Roesch
INVENTOR

BY Victor J. Evans
ATTORNEY

WITNESS:

Sept. 7, 1926.
C. G. ROESCH
1,599,350
ELECTRICAL ADVERTISING MACHINE
Filed Nov. 7, 1924    6 Sheets-Sheet 2
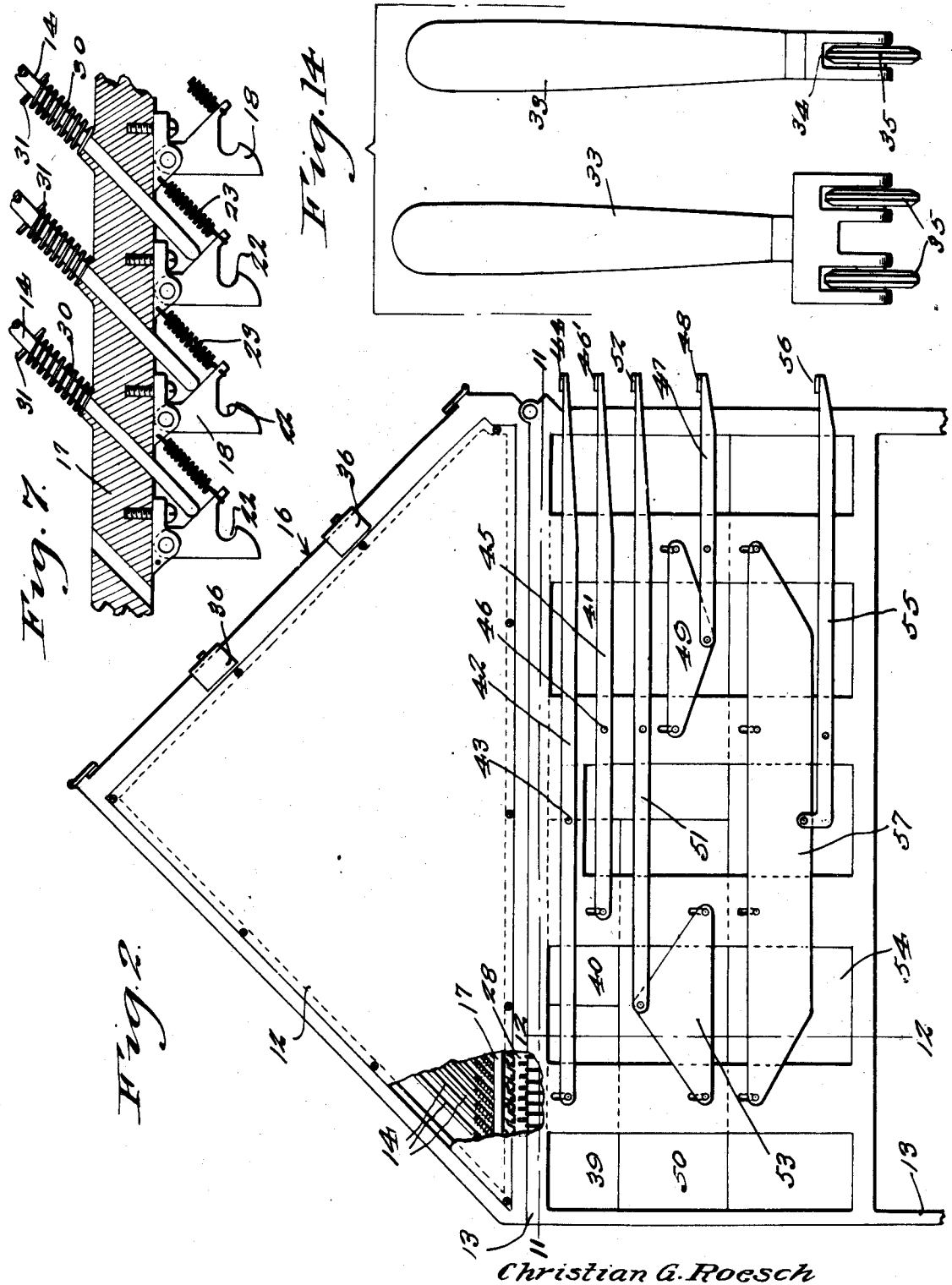
Christian G. Roesch
INVENTOR
BY Victor J. Evans
ATTORNEY
WITNESS:

Sept. 7, 1926. 1,599,350
C. G. ROESCH
ELECTRICAL ADVERTISING MACHINE
Filed Nov. 7, 1924   6 Sheets-Sheet 3
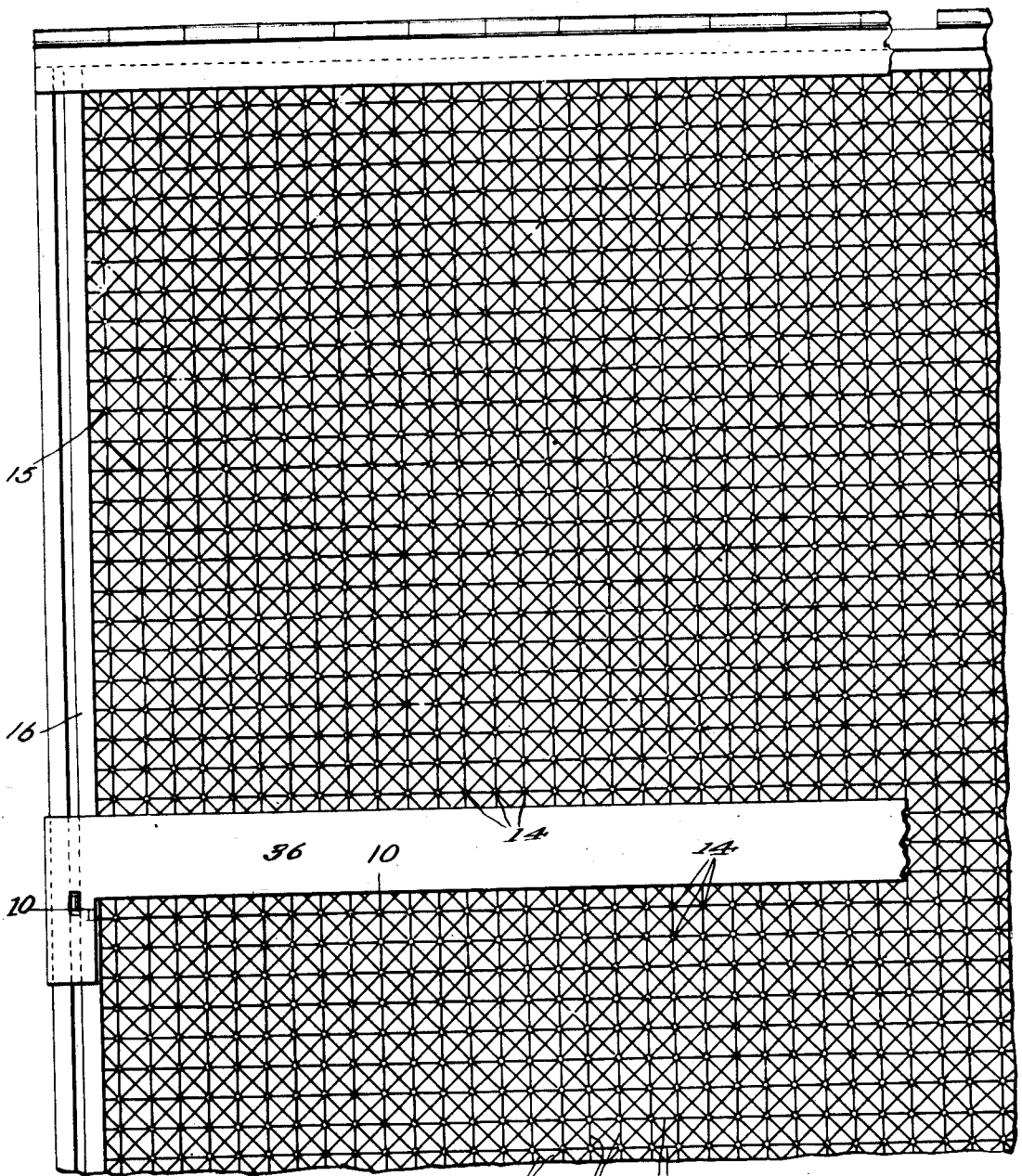
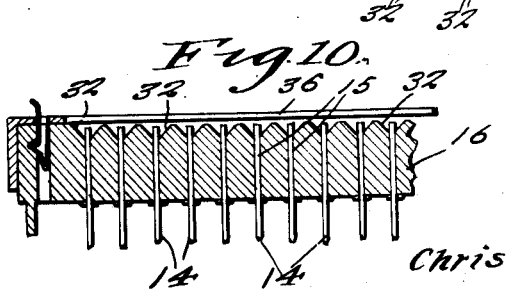
Christian G. Roesch INVENTOR
BY *Victor J. Evans*
ATTORNEY Sept. 7, 1926. 1,599,350
C. G. ROESCH
ELECTRICAL ADVERTISING MACHINE
Filed Nov. 7, 1924  6 Sheets-Sheet 4
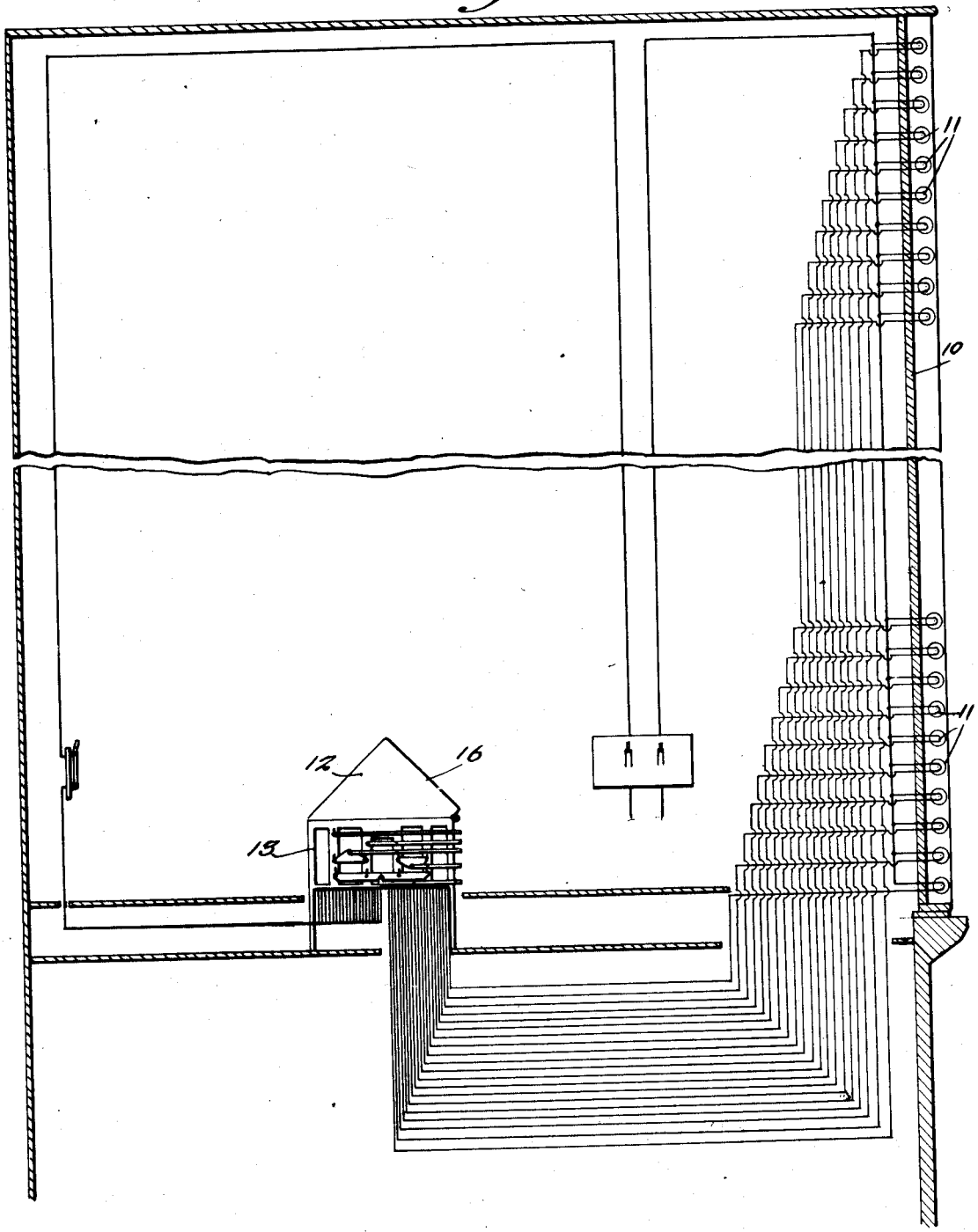

Sept. 7, 1926.  
C. G. ROESCH  
1,599,350  
ELECTRICAL ADVERTISING MACHINE  
Filed Nov. 7, 1924  
6 Sheets-Sheet 5
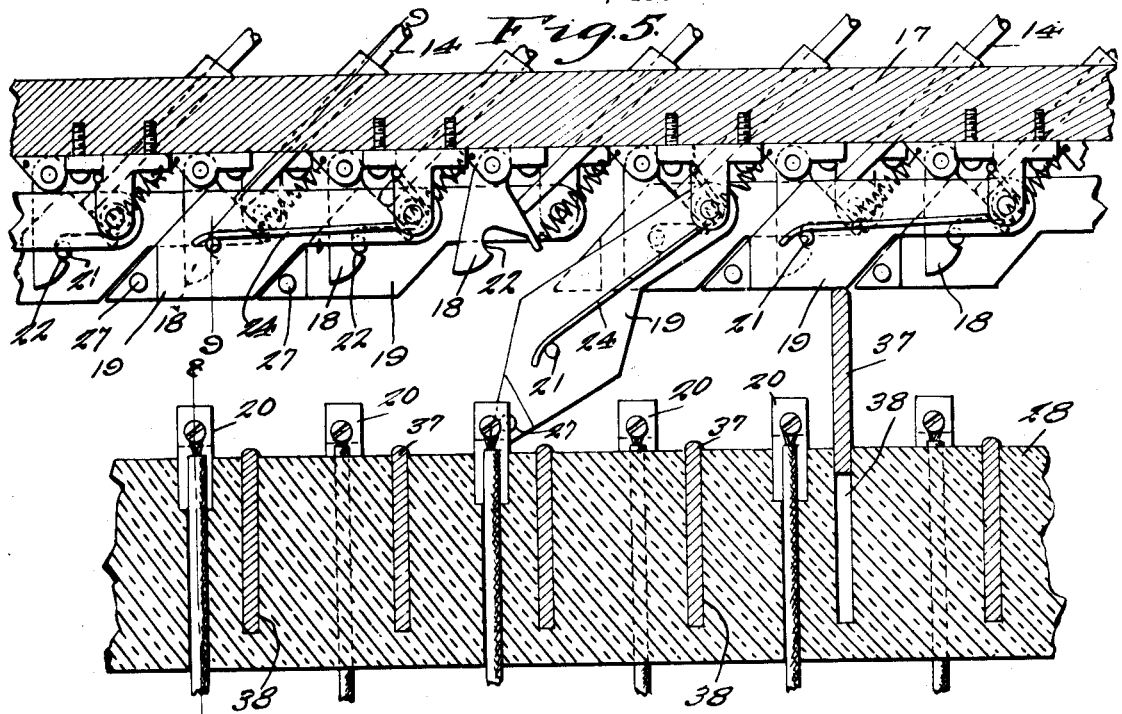
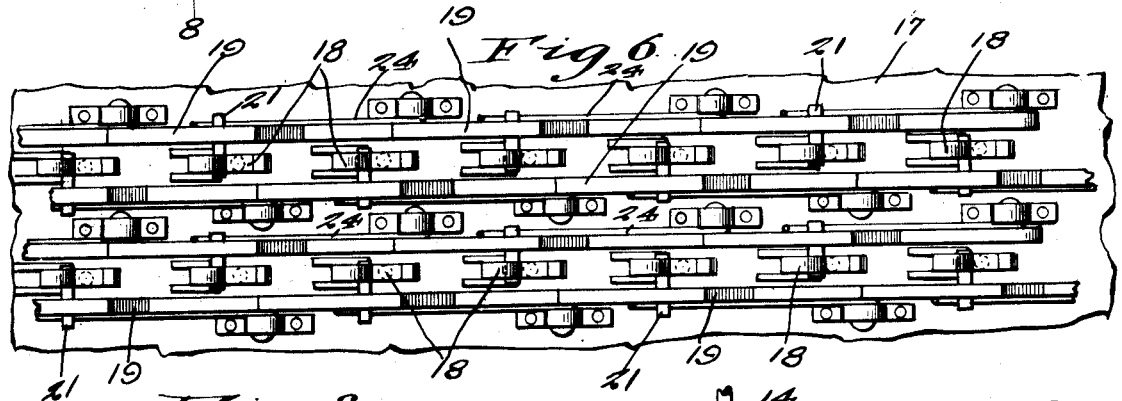
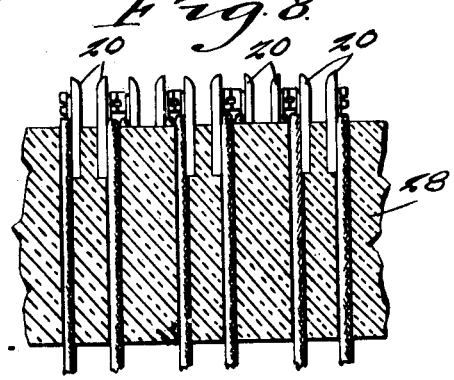
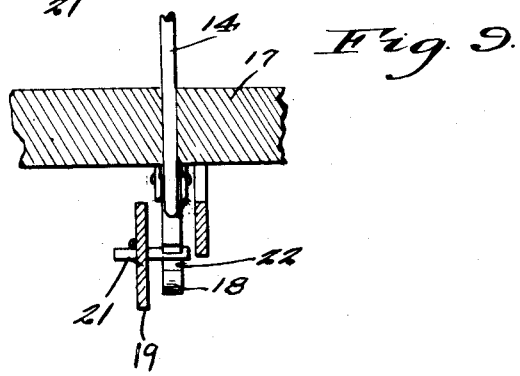
Christian G. Roesch
INVENTOR
BY Victor J. Evans
ATTORNEY Sept. 7, 1926. 1,599,350
C. G. ROESCH
ELECTRICAL ADVERTISING MACHINE
Filed Nov. 7, 1924    6 Sheets-Sheet 6

Christian G. Roesch INVENTOR
BY Victor J. Evans
ATTORNEY

WITNESS:

Patented Sept. 7, 1926.

1,599,350

UNITED STATES PATENT OFFICE.

CHRISTIAN G. ROESCH, OF NEW YORK, N. Y.

ELECTRICAL ADVERTISING MACHINE.

Application filed November 7, 1924. Serial No. 748,472.

This invention relates to electrical advertising machines, and contemplates a structure including a sign board which supports a plurality of electric light bulbs arranged in normally open circuits, and adapted to be illuminated in different combinations, for the purpose of forming any letter, word or combinations of letters on the board for advertising purposes.

The chief characteristic of the present invention residing in the provision of a novel construction of means for selectively illuminating the bulbs in the manner and for the purpose above stated, and a provision of means for extinguishing the bulbs when desired.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 2 is a view in elevation of the housing for the means employed for selectively illuminating said bulbs and extinguishing the bulbs, said housing being partly broken away.

Figure 3 is a fragmentary plan view of said housing.

Figure 4 is a sectional view through the machine showing the relative arrangement of the operating means with respect to the sign board.

Figure 5 is an enlarged fragmentary sectional view showing the arrangement of the switches used for closing the circuits to said bulbs and also showing how the switches are returned to their normal positions.

Figure 6 is a bottom plan view of Figure 5.

Figure 7 is a fragmentary view of the operating means showing how the plungers are mounted with relation to the pivoted latch elements to the various switches.

Figure 8 is a sectional view taken on line 8—8 of Figure 5.

Figure 9 is a sectional view taken on line 9—9 of Figure 5.

Figure 10 is a sectional view taken on line 10—10 of Figure 3.

Figure 14 is a view showing different types of devices used for operating the plungers.

Figure 1:
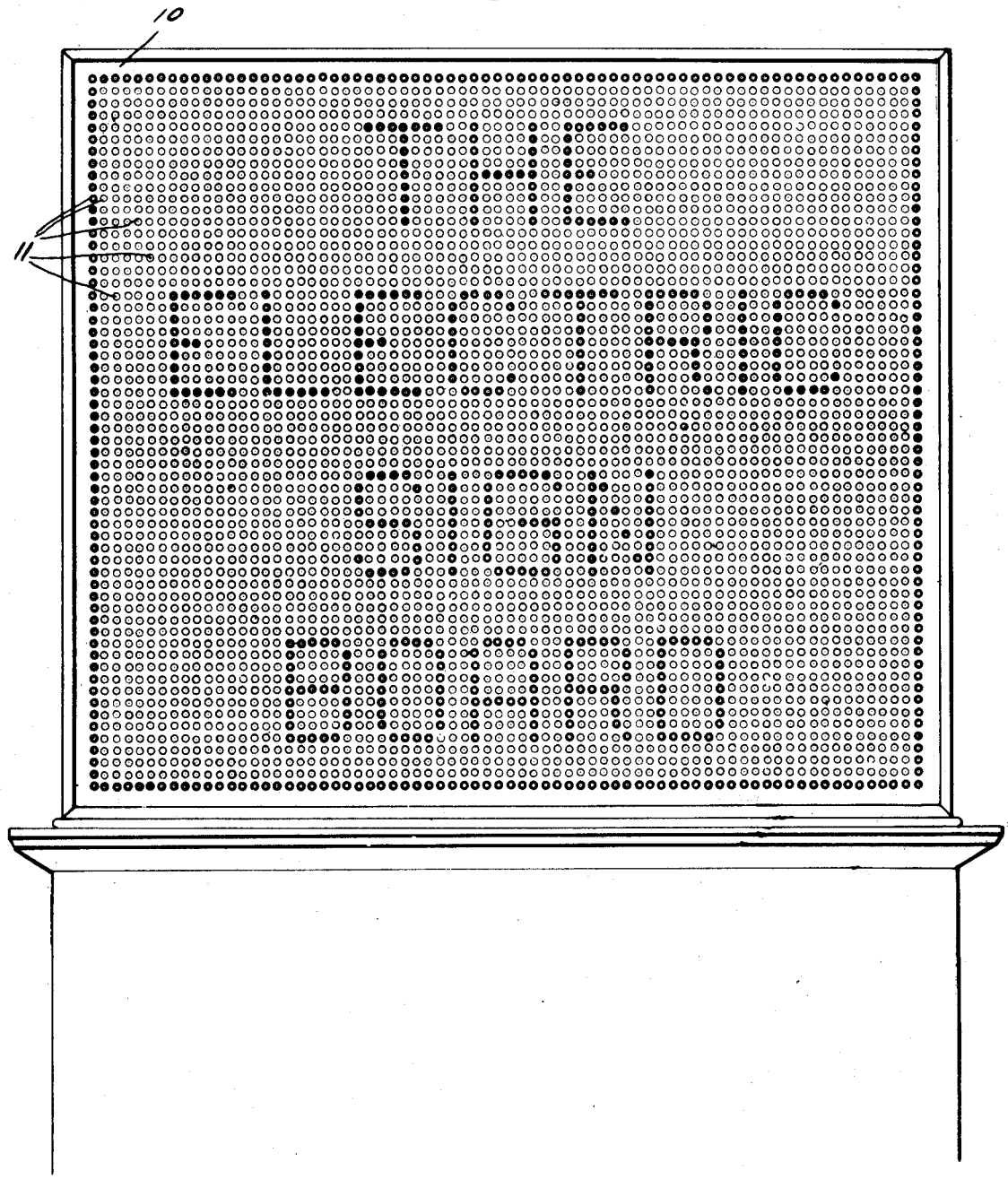
Figure 1 is a front elevation of the machine.

The present invention contemplates the use of a sign board indicated at 10, and this board is adapted to support a plurality of electric light bulbs which are arranged in normally open circuits, and adapted to be selectively illuminated in different combinations, to form any particular letter, combination of letters or words, or any particular design or monogram for advertising purposes. The board 10 is adapted to be arranged at any advantageous position, or at some point remote from the mechanism used to selectively illuminate and extinguish the bulbs. The board 10 may also vary in size and configuration without departing from the spirit of the invention, and may also support any number of rows of electric light bulbs. The board however, is preferably of a size to support a plurality of bulbs arranged in vertical and horizontal rows of 60 bulbs in each vertical row and approximately 72 bulbs in each horizontal row. As shown in Figure 4, these bulbs are arranged in normally open circuits and connected in parallel, and the means for selectively closing these circuits for the purpose above stated is arranged in a housing 12 which reposes upon a suitable supporting structure 13 as clearly shown in Figure 2. This housing and its supporting structure can be arranged at any place within a room or building, or it may be arranged within a suitable casing constituting the body of the machine, and upon one side of which is mounted the sign board 10.

As illustrated in Figures 2 and 4, the housing 12 is preferably of inverted V-shaped formation in elevation, and arranged within this housing is a plurality of plunger rods 14 which have their corresponding upper extremities projecting through openings 15 in one side of said housing, which side is indicated at 16. The other corresponding extremities of these rods 14 project through the board 17 of the housing as clearly shown in Figure 7, and each rod bears against a pivoted latch 18 suspended from the underside of the board 17 and utilized to maintain the movable switch elements in their normal horizontal positions. There is one of these movable switch elements 19 for each bulb 11, and each switch element 19 when moved from its normal horizontal position to its active position as shown in Figure 5, said element 19 is received between a pair of fixed contacts 20 which of course closes the circuit to the particular bulb on the sign board 10. Carried by each movable contact 19 is a transverse pin 21 which projects beyond the opposite sides of the element 19 as shown in Figure 9. One end of each pin is adapted to be received by a notch 22 formed in the adjacent latch element 18 to hold the movable switch element 19 normally in a horizontal position, each latch element being normally held in its active position by a coiled spring 23 terminally connected with the bottom of the housing, and with said latch. The other end of each pin 21 is engaged by a leaf spring 24, which spring is connected with the pivot for the switch element 19. The spring 24 is under tension when the switch element 19 is in its normal position, and just as soon as the said switch element is released from its cooperating latch 18, the spring 24 functions to move the switch element from its normally horizontal position, to its active position as shown in Figure 5. The free end of each movable switch element 19 is reduced as at 25 to be received by a covering 26 of suitable insulated material, while passed transversely through said insulated covering is a headed pin 27 which engages the fixed contacts 20 to close the circuit for the particular bulb adapted to be illuminated by said switch. The fixed contacts 20 are supported by a base or wall of insulated material indicated at 28, which is arranged directly beneath and parallel with the board 17 of the housing above referred to, this arrangement being clearly illustrated in Figure 5. Surrounding each plunger rod 14 is a coiled spring 30, one end of which bears against a cross pin 31 carried by said rod, while the other end of the spring bears against the bottom 17 of said housing. These springs normally hold the rods 14 projected through the openings 15 in the side 16 of the housing. In order to release any particular switch element 19, it is necessary to depress the adjacent rod 14 against the tension of its spring 30, and when this rod is depressed, it pushes upon the adjacent latch element 18, swinging the latter away from the cross pin 21 with which it was initially associated, thereby allowing the particular switch element 19 to be thrown to its active position through the instrumentality of the spring 24 above referred to. After each rod has been depressed in the manner and for the purpose just described, the spring 30 returns the rod to its normal position, while the spring 23 returns the particular latch element to its normal position. Inasmuch as there is one rod 14 for each movable switch element 19, and one of these switch elements 19 for each bulb 11, the various bulbs supported by the sign board 10 can be selectively illuminated in different combinations to form any particular letter, or combination of letters, or words, which of course are presented to view from the sign board for advertising purposes.

It will now be noted upon inspection of Figures 3 and 10 that the side 16 of the housing 12 is provided with an opening 15 for each rod 14, while intersecting these openings are grooves 32. As shown in Figure 10, the corresponding upper extremities of the rods 14 project through said openings 15 into grooves 32, so that the said rods can be conveniently and easily depressed by means of hand devices of the character shown in Figure 14. Each of these devices includes a handle 33 which is bifurcated at one end as at 32, and journaled in said bifurcations is one or two rollers 35. In other words, one of the devices is provided with a single roller, while the other hand device is provided with a pair of such rollers, and their use depends upon the desirability of singly depressing the rods 14, or operating two of these rods simultaneously. The hand device is used by rotating the roller or rollers 35 in one or two of the grooves 32 formed on the side 16 of the housing, and it is obvious that as the rollers pass through said grooves, the rods engaged by said rollers are depressed to release the corresponding switch elements 19 in the manner above described. The hand devices are preferably used in connection with stencils which are first laid upon the side 16 of the housing, and as the rollers are passed over the stencils, the rods 14 are selectively depressed or operated to illuminate predetermined combinations of bulbs on the board 10 to form the necessary letters of a particular word or group of words to be presented to view for advertising purposes. The manner of using the bulbs in this connection is clearly illustrated in Figure 1, wherein it will be noted that certain combinations of bulbs are used to spell the words "The electric sign board". It is of course to be understood that the hand device shown in Figure 14 can be used independently of the stencil above referred to, and that use may be made of a rule 36 which is mounted for sliding movement upon the wall or side 16 of the housing. The rule 36 is of course used to guide the roller or rollers in a straight line through a particular groove or grooves 32 formed in the side 16 of said housing.

Figure 11:
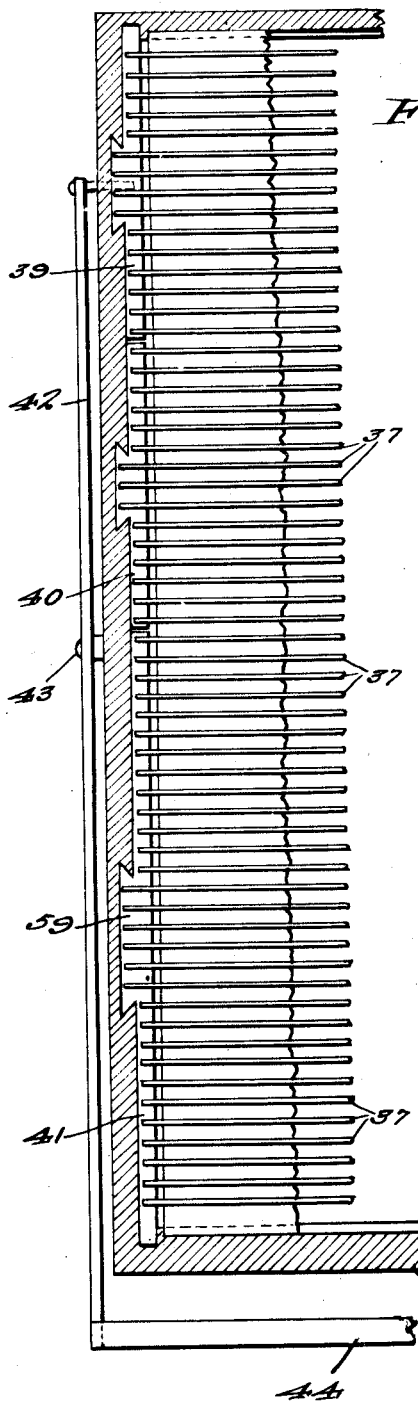
Figure 11 is a sectional view taken on line 11—11 of Figure 2.
Figure 12:
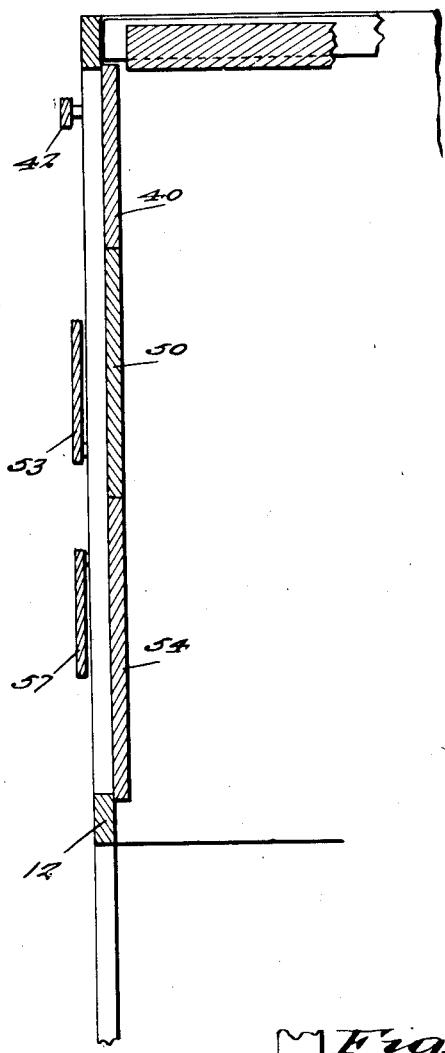
Figure 12 is a sectional view taken on line 12—12 of Figure 2.
Figure 13:
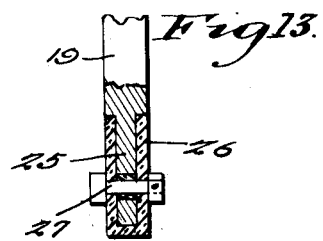
Figure 13 is a fragmentary sectional view of one of the movable switch elements.

The various movable switch elements 19 called into use remain in their active positions until they are returned to their normal positions by the manually operable means to be presently described, which means is mounted on the supporting structure 13 for the housing 12. This means includes a plurality of slides 37 which are arranged in spaced parallel relation, and slide within grooves 38 formed in the base or wall 28 above referred to and clearly shown in Figure 5. These slides 37 are arranged beneath the switch elements 19 and transversely thereof, so that when any slide is elevated as shown in Figure 5, it engages all of the switch elements 19 of a particular row and returns said elements to their normal horizontal positions. As these elements are moved into their normal positions, the pins 21 are engaged by the latch elements 18. It will be noted upon inspection of Figure 6 that the various switch elements 19 and the latch elements 18 are arranged in staggered relation, so that each slide 37 is capable of returning a plurality of switch elements 19 to their normal positions upon each operation. The slides 37 repose upon a series of plates arranged longitudinally within the supporting structure 13, there being a series of these plates arranged in each side of the supporting structure, the plates being utilized to raise the slides 37 to an active position in the manner to be presently described. The plates of each series are arranged in end to end relation and are indicated at 39, 40 and 41 respectively. There is a series of these plates at each side of the supporting structure, and the corresponding plates 39 and 40 of the respective series are of equal length. In other words, each of these plates 39 and 40 is of a length to support approximately 15 of the slides 37, so that when either pair of plates are operated, 15 of the said slides 37 are elevated to operate all of the switch elements 19 arranged in the path of said slides, and thus simultaneously extinguish all of the bulbs connected in circuit with said switch elements. The corresponding plates 39 of the respective series are operated by levers 42 arranged in parallelism at opposite sides of the supporting structure and pivoted as at 43. These levers have their free extremities connected by means of a cross bar or handle 44, which when depressed operates the pair of plates 39 for the purpose just mentioned. The plates 40 of the respective series are also simultaneously operated in the same manner by the levers 45 which are pivoted as at 46 at the opposite sides of said supporting structure 13, and which levers are connected together by a handle bar 46'. When these levers are actuated the plates 40 are moved upwardly to raise another series of 15 slides, which of course extinguishes another group of bulbs which are connected in circuit with any of the switch elements 19 arranged in the path of movement of this last group of slides 37. By operating the plates 39 and 40, any and all illuminated bulbs arranged upon the upper half of the sign board are extinguished, while any and all illuminated bulbs arranged on the lower half of the sign board are similarly extinguished through the instrumentality of the plate 41. As shown in Figures 2 and 11, this plate 41 is arranged in end to end relation with the plates 40, but also extends beneath the lower half of these plates for a purpose to be hereinafter described. These plates 41 are simultaneously operated through levers 47 arranged at opposite sides of the supporting structure and connected by a cross bar or handle 48, so that said levers can be simultaneously operated. Each lever 47 is connected with the adjacent plate 41 by means of a link 49 which is terminally connected with the plate 41, and pivoted at a point between its ends to the lever 47. When the plate 41 is raised, the remaining 30 slides 37 are simultaneously elevated to extinguish any and all of the illuminated bulbs on the lower half of the sign board.

Now, arranged beneath the plates 39 and 40 of the respective series of said plates are plates 50, and each of these plates is of a length equal to the combined length of the adjacent plates 39 and 40. The plates 50 at opposite sides of the supporting structure are adapted to be simultaneously operated by levers 51 arranged in the same manner as the other levers above described, and which levers 51 are connected by a cross bar or handle 52. The corresponding extremities of the levers 51 are connected with the aforesaid plates 50 through the instrumentality of links 53, so that when the handle bar 52 is depressed, the plates 50 at opposite sides of the supporting structure are simultaneously lifted. When these plates are lifted they raise both of the adjacent plates 39 and 40 above referred to, and consequently 30 of the slides 37 are simultaneously operated to extinguish any and all of the illuminated bulbs on the upper half of the sign board 10. Manifestly, the plates 50 are only used when it is desired to extinguish all of the illuminated bulbs on the upper half of the sign board, but when it is desired to extinguish only a certain group or number of such bulbs either of the plates 39 or 40 of the respective series is independently operated.

It will be further observed upon inspection of Figure 2 that the plates 50 have their lower edges lying flush with the corresponding edges of the plates 41, inasmuch as the plates 50 and plates 41 at each side of the supporting structure are to repose upon a plate 54 which is of a length equal to the combined lengths of the plates 50 and 41 respectively. The plates 54 at both sides of the supporting structure are also adapted to be simultaneously raised and lowered through the instrumentality of the levers 55 which are arranged upon the supporting structure in the manner described in connection with other levers, and which levers 55 are connected by a cross bar or handle 56. A comparatively long link 57 is pivoted on the inner end of each lever 55, and the upper edge of each link 57 at four distinct points are connected with the adjacent plate 54. The purpose of the plate 54 is to elevate all of the plates above referred to, and arranged above the plate 54 so that when the handle bar 56 is depressed, all of the illuminated bulbs on the sign board are simultaneously extinguished. It will be noted upon reference to Figure 11 that each of the plates hereinabove described is formed with a dovetailed extension 59 which is received by a groove of similar contour formed in the adjacent side of the supporting structure to hold the plates operatively positioned with relation to each other and also with relation to the slides 37 and to furthermore guide said plates in their movements. It is manifest from the foregoing description, that I have devised an electric sign board which supports a large number of electric light bulbs which can be easily and conveniently illuminated in different combinations over the entire area of the board or any part thereof for the purpose of forming certain letters, words or sentences for advertising purposes, and that any one or more of said bulbs can be independently and collectively extinguished through the arrangement of the levers above described.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

1. In combination, a plurality of independently movable switch elements, a pivoted latch for normally holding each element in its inactive position, means for automatically moving each switch element to an active position and holding it in said position, subsequently to its release from said latch elements and means for returning said switch elements to their normal position.

2. In combination, a plurality of independently movable switch elements, a pivoted latch element for normally holding each switch element in its inactive position, means for automatically moving each switch element to an active position and holding it in said position, subsequent to its release from said latch element, and manually operable means for returning any one or predetermined numbers of said switch elements to their normal position.

3. In combination, a plurality of independently movable switch elements, a pivoted latch normally holding each switch element in its inactive position, a rod for each switch element, said rods being mounted for sliding movement, and adapted to be depressed to effect a release of said elements from said latches, means for moving each switch element to its active position subsequently to its release, and means for returning one or any predetermined numbers of said switch elements to normal position.

4. In combination, a housing having a plurality of openings in the top thereof, a plurality of independently movable switch elements arranged in said housing, a pivoted latch for normally holding each element in its inactive position, a sliding rod for each latch element, said rods having their corresponding extremities projecting through said openings of said housing, whereby said rods can be readily depressed to effect a release of any of said switch elements, means for automatically moving each switch element to an active position, and means for returning one or predetermined numbers of said switch elements to their inactive positions.

5. The combination with a switch including a plurality of switch operating rods mounted for sliding movement, of a housing having openings in the top thereof through which said rods project, and grooves intersecting said openings, a handle, a wheel journaled in said handle and adapted to be moved through said grooves to depress said rods for the purpose specified.

In testimony whereof I affix my signature.
CHRISTIAN G. ROESCH.